Figure 1:
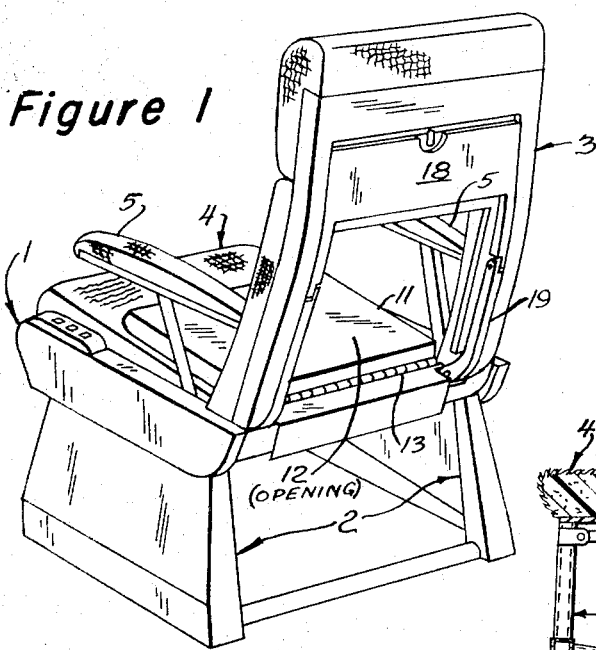

United States Patent [19]
Weik et al.

[11] 3,761,124
[45] Sept. 25, 1973

[54] VEHICULAR SEAT WITH FOOTREST OPENING FROM FORWARD SWINGING SEAT BACK PANEL SECTION

[75] Inventors: Kirby B. Weik; Edward J. Brennan, both of Bantam, Conn.

[73] Assignee: Universal Oil Products Company, Des Plaines, Ill.

[22] Filed: Dec. 27, 1971

[21] Appl. No.: 212,609

[52] U.S. Cl. ............................ 297/112, 297/425
[51] Int. Cl. ........................ A47c 7/50, A47c 13/00
[58] Field of Search ................... 297/112, 425, 438, 297/439, 456

[56] References Cited
UNITED STATES PATENTS
2,583,223  1/1952  Mayer ............................... 297/425
1,596,909  8/1926  Weeks ............................... 297/112

Primary Examiner—Casmir A. Nunberg
Attorney—James R. Hoatson, Jr. et al.

[57] ABSTRACT

A vehicular passenger seat is provided with a special movable seat back panel section that has hinging means to permit such panel to pivot forwardly over the top of the seat cushion portion of the seating unit. The construction is such as to provide for a leg-footrest opening in the back of an unoccupied seat to be usable by a seat occupant to the rear. No tools or disassembly steps are involved in the opening or closing of the leg opening.

7 Claims, 5 Drawing Figures

PATENTED SEP 25 1973 3,761,124

VEHICULAR SEAT WITH FOOTREST OPENING FROM FORWARD SWINGING SEAT BACK PANEL SECTION

This invention relates to a novel seat back construction for a vehicle passenger seating unit which permits the opening of a panel section that will result in providing a footrest arrangement for an occupant in a seat unit to the rear.

More specifically, the improved novel design provides for the forward hinging action of at least one back panel section such that it will move outwardly over the cushioned seat section of the seat unit and permit leg or foot resting on the top of the seat section or, alternatively, have the back of the panel section become the footrest surface for the seat occupant just to the rear.

There are many trips that an airplane, train, bus, or other conveyance may take where the full seating capacity is not being used by the traveling public. Thus, for the benefit of the traveler, there is means provided in the seat back construction to open a lower portion of the back and effect a leg-footrest means.

It is realized that train seats and street-car or subway seats have heretofore been made so that the backs are movable and there could be a 180° reversal in the direction of seating for an occupant. However, with planes, buses, etc., where the passenger section does not change in the direction of movement, then the typical seat unit does not have a reversing back section. It is, of course, customary to have foot rails, or platforms just above the floor area, as footrest means. It is also conventional to have reclining seat backs for passenger comfort; but, removable seat back panel sections for the benefit of forming a footrest to be used by a seat occupant to the rear is believed to be unique.

It may therefore be considered a principal object of the present invention to provide a seat construction which embodies a lower, forwardly movable panel section in a seat back such that a footrest opening is provided therethrough.

It may also be considered an object of the present invention to have a seat back construction which permits adjustable backward tilting, or recline, while at the same time having provision for a forwardly hinging panel section such that there can be foot or leg resting directly on the unoccupied cushioned seating section of the seat unit. Normally, of course, the seat back would not be in a recline position when the back panel is open for footrest purposes. A push or pull button latch means may be used to hold the movable panel section in place within the seat back; however, no tools or disassembly operations are required to be used by the passenger or by a stewardess.

Broadly, the present invention embodies a passenger vehicle seat unit providing leg-footrest means over the seat portion thereof when unoccupied, which comprises in combination, a seat supporting base, a cushioned seat section, and an openable reclining seat back, said seat back having side post-like portions which hingedly connect to the supporting base in a manner to permit seat back recline while connecting at their upper ends to form a full width upper transverse seat back headrest section, and said reclining seat back additionally includes a lower and forward movable central panel, with the latter being hingedly connected to said back in a manner to swing forwardly over the cushioned seat section of the seat unit and thereby effect a resulting opening in said seat back to provide a footrest arrangement for an occupant in a seat unit to the rear.

In a specific embodiment, the movable back panel section will have a hinged connection along a lower rear edge portion thereof to the seat unit such that it can fold forwardly to rest directly on the cushioned seating section. In this instance, the rearward passenger would utilize the back surface of the movable panel as a leg or footrest section.

In an alternative design, the movable panel section, or split panel sections, could be side hinged with respect to the back of the seating unit so that the one section, or both panel sections, can swing "door-like" outwardly over the top of the seat cushion section of the seating unit to provide for the desired foot-legrest opening.

In still another embodiment, the movable panel section may be hingedly connected along a top portion thereof to the seat back and provide for an upwardly swinging arrangement so that the resulting opening in the seat back again provides for foot or legrest space. In this latter embodiment, suitable locking brace means may be required to hold the upwardly swinging panel section in an elevated position. As a modification or variation of this last embodiment, there may be a connection between the lower edge portion of the upwardly swinging back panel section and the rearward edge portion of the cushion seating section whereby the rear of the seat section is lifted upwardly along the lower edge of the top hinged back panel section. In other words, the cushioned seating section will finally be positioned so as to be substantially standing on its front edge and the combination of such sections will provide a top closure or canopy effect over the opening in the seat back and over the area normally used as the resting section.

It is not intended to limit the design and construction used to arrive at any one of the particular variations or to have any one predetermined size and shape to the opening. Actually, the opening in the back of the seat, as provided by the movable panel section, should be sufficiently adequate to provide such leg-footrest space with some freedom of movement for the person using the facility, including room for recrossing of the legs without feeling confined or causing the passenger to easily bump his legs against side portions of the seat back.

Where the back panel section is folded over onto the cushioned seat section such that the back of the panel provides a footresting surface, then such surface will typically be provided with a tough long-wearing fabric or with rug-like material. Alternatively, a hard surface finish such as Formica which will not show scratches or shoe marks may be used to advantage. In any event, even for the purpose of providing a finished surface, the back of panel section, whether of plastic, fabric, vinyl, artificial leather, or whatever, should have a covering or finish which will provide good appearance aspects.

Reference to the accompanying drawing and the following descriptions thereof will serve to show various embodiments and constructions of the basic concept, as well as permit the setting forth of additional advantageous features with respect to the movable panel footrest arrangement.

FIG. 1 of the drawing is an isometric type rear elevational view of the seating unit with a movable back panel section that can fold forwardly over the cushioned seat section of the unit.

Figure 2:
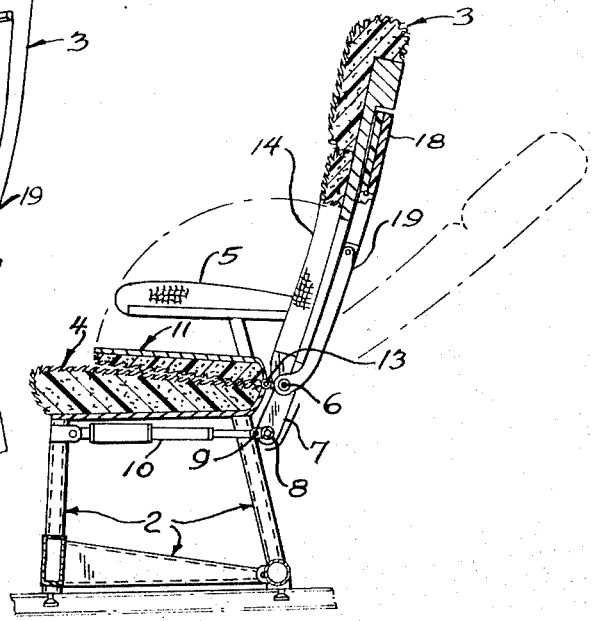

FIG. 2 of the drawing is a sectional elevational view showing in a diagrammatic manner how a forward folding, bottom hinged back panel section can move forwardly to rest on the seat cushion section of the seating unit.

Figure 3:
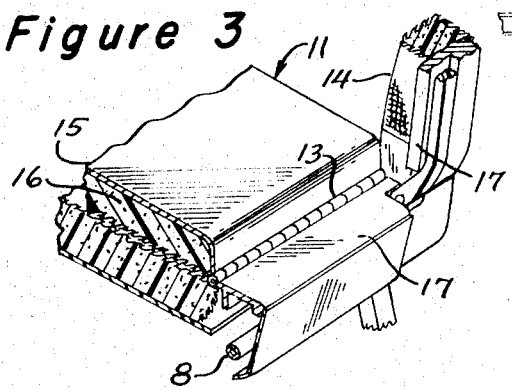

FIG. 3 of the drawing is a partial isometric view, somewhat enlarged in scale, to show a bottom hinging arrangement for the movable back panel section of the type indicated in FIGS. 1 and 2.

Figure 4:
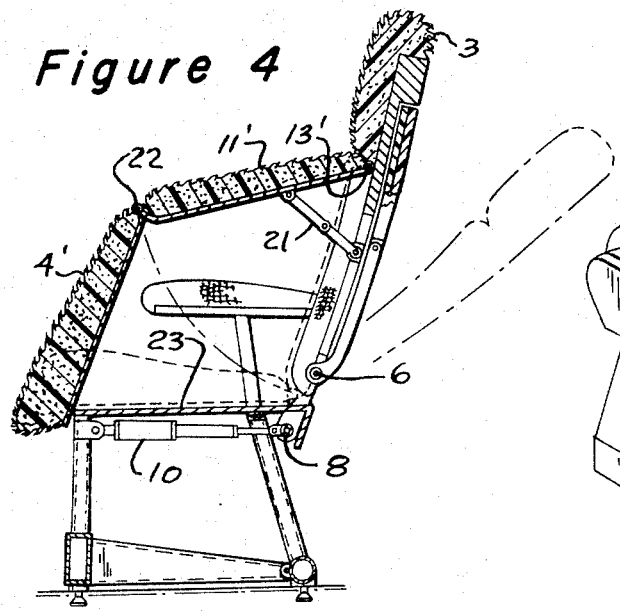

FIG. 4 of the drawing is a diagrammatic sectional elevational view showing a top hinged back panel section which, additionally, is attached to the rear edge portion of the cushioned seating section such that the latter can be raised and elevated, in canopy fashion, along with the lower edge portion of the forwardly movable back panel section.

Figure 5:
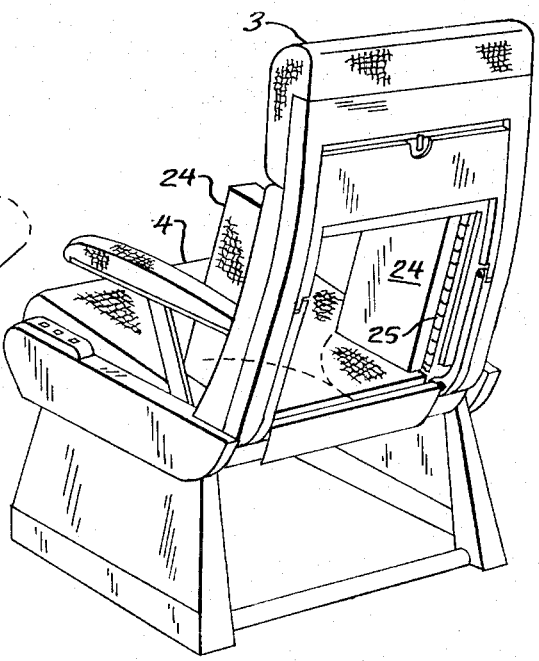

FIG. 5 of the drawing shows a modified design where the back panel section is in two parts and there are side hinges to permit each portion of the movable back panel to swing outwardly over the seating section.

Referring now particularly to FIGS. 1, 2 and 3 of the drawing, there is shown a seating unit 1 with a supporting base portion 2, a hinged and tiltable back section 3, and a cushioned seating section 4. There are also indicated suitable armrest means 5. As best shown in FIG. 2, the seat back portion 3 will be of a recline construction to provide for individual seating comfort in a passenger vehicle. Various means may be provided for effecting seat back tilting; however, for illustrative purposes, the present embodiment indicates a pivot point at 6 and lower extended side portions 7 which connect to a cross member 8 that in turn may connect at pivot point 9 with a seat adjustment means 10. There are various types of mechanical lock means or hydraulic locks which may be used under a seat unit, such as indicated at 10, which in turn can be push-button operated to provide tilt back adjustment for the back of a passenger seat and it is not believed necessary to provide detailed descriptive matter herein.

In accordance with the present invention, there is shown, within each of the FIGS. 1, 2 and 3, a back panel section 11 which is sized to fit within a central portion of the seat back 3 and provide a resulting opening 12 which can be utilized for the insertion of the feet or legs of a vehicle passenger sitting directly to the rear of the seating unit shown. The specific embodiment of FIGS. 1, 2 and 3 also indicates that the back panel section 11 is horizontally hinged through the use of hinge member 13 or by equivalent pivot means around a rod means extending transversely across the lower edge portion of opening 12 and between side post portions 14 for the back of the seat unit. The hinging arrangement is best shown in FIG. 3. Also in the latter Figure the movable panel section 11 is indicated as having a back plate portion 15 of metal, or of plastic, suitable to be a supporting base for latex, polyurethane foam, or other soft resilient cushioning material 16. Although not shown, such materials will typically be covered or upholstered with a suitable fabric which will be similar to the rest of the seat covering or compatible therewith, in order to provide a proper appearance. In FIG. 3, it will also be seen that a suitable shoulder means 17 may be provided around the periphery of the opening 12 through the seat back section so that there is, in effect, a recess or "door-stop" construction for accommodating the abutting engagement of the movable back panel 11 when the latter is lifted back to its normal position for closing the opening in the back of the seat and, in turn, providing a lower back support portion for a seat occupant.

For illustrative purposes, a downwardly hinging service tray or food table 18, having extended arms 19 pivoting about seat back hinge points 6, is shown in connection with FIGS. 2 and 3; however, it will be obvious to those skilled in the seat designing arts that the present invention need not be limited to this type of food serving tray. Also, it should be noted that in the event a conventional type of hinged food serving tray is utilized on the seat back 3 then such tray or food table should be arranged so that the lower edge thereof, when being in the stored portion, will pass over the top of the opening 12 being provided in the back of the seat 1 for footrest purposes.

In FIG. 4 of the drawing, there is shown a modified design where a back panel section 11' is top hinged around transverse rod or hinge means 13' whereby the opening for the seat back is made by lifting the back panel section forwardly and upwardly from a lower edge portion. In this type of construction, there can be knee-brace type hinging means, such as 21, provided along at least one side of the opening through the seat back 3 whereby the panel section 11' can be locked in the upright position and not permitted to easily collapse down onto a passenger having his feet or legs resting upon the seating unit. It should be further noted in connection with the present embodiment that the lower edge portion of panel section 11' has additional hinging connection means at 22 with respect to the back edge portion of cushioned seating section 4' such that the latter is elevated along with the back panel section. In this type of construction, the seat cushion section 4' must be free to slide and pivot about a front edge portion within the seat unit in order to be movable and liftable. In this embodiment there is also indicated the availability of a seat support base or pan section 23 which, in turn, may have a tough wearable fabric, or a rug-like material, suitable to accommodate the feet and legs of a passenger to the rear of the seat unit in question.

In the modified embodiment of FIG. 5 of the drawing, there is indicated in a diagrammatic isometric type view the utilization of two side-hinged panel sections 24 which can be moved more or less horizontally about up and down hinging means 25 so as to swing outwardly over the cushion seat section 4 to provide the desired legrest opening through the back 3 of the seating unit. Although not shown, suitable locking and laterally positioned hinged braces can be utilized in connection with each of the swinging panel sections 24 such that the latter will stay in their outward opened positions in order to preclude a loosely swinging contact with the passenger's feet or legs.

It will be apparent to those familiar with the manufacture and design of passenger seat units for airplanes, buses or other vehicles, that various modifications in overall seat design and hinging arrangements with movable back panel sections can be developed. Also, it is not intended to limit the present invention to any one type of hinging system or to any particular materials of construction inasmuch as various types of materials and coverings might well be utilized, such as heretofore noted. Still further, the movable back panel sections may well be provided with varying thicknesses and/or means for having an adjustable thickness in the manner of adjustable lumbar support cushion means so that different degrees of back support can be provided to suit the desires of a particular seat occupant when the panel is closed and the seat is occupied.

We claim as our invention:

1. A passenger vehicle seat unit providing legfootrest means over the seat portion thereof when unoccupied, which comprises in combination, a seat supporting base, a cushioned seat section, and an openable reclining seat back, said seat back having side post-like portions which hingedly connect to the supporting base in a manner to permit seat back recline while connecting at their upper ends to form a full width upper transverse seat back headrest section, said seat back filling the space between said post-like portions, and said reclining seat back additionally including a lower and forward movable central panel section, with the latter being hingedly connected to said back in a manner to swing forwardly over said cushioned seat section of the seat unit and thereby effect a resulting opening in said seat back to provide a footrest arrangement for an occupant in a seat unit the rear.

2. The vehicle seat unit of claim 1 further characterized in that said movable central panel section is hingedly connected with the seat along a lower bottom edge portion whereby such section can fold forwardly to rest upon the cushioned seat section of the seat unit.

3. The vehicle seat unit of claim 1 further characterized in that said movable central panel section is hingedly connected to the seat back along an upper edge portion whereby such panel section is movable upwardly and forwardly to provide a resulting footrest opening in the seat back.

4. The vehicle seat unit of claim 3 still further characterized in that the lower edge portion of the movable central panel section hingedly connects to a back portion of the cushioned seat section whereby the rear end of the latter is lifted upwardly and outwardly as the back panel section is lifted upwardly and outwardly from its top hinging.

5. The vehicle seat unit of claim 1 further characterized in that said central panel section is provided with generally vertically disposed hinging means whereby such section can pivot generally horizontally outwardly over the top of the cushioned seat section to provide an opening in the seat back for footrest purposes.

6. The vehicle seat unit of claim 5 still further characterized in that said movable central panel section is provided in two parts which meet in the mid-portion of the seat and each part is side-hinged in its connection with a seat back whereby each such panel portion may swing outwardly over the cushioned seat section to provide the desired opening in the seat back for footrest purposes.

7. The vehicle seat unit of claim 1 further characterized in that said movable central panel section is provided with a back wear-resistant surface suitable to serve as a footrest.

* * * * *